No. 789,080. PATENTED MAY 2, 1905.
E. D. CONROY.
LEMON JUICE EXTRACTOR.
APPLICATION FILED OCT. 13, 1904.
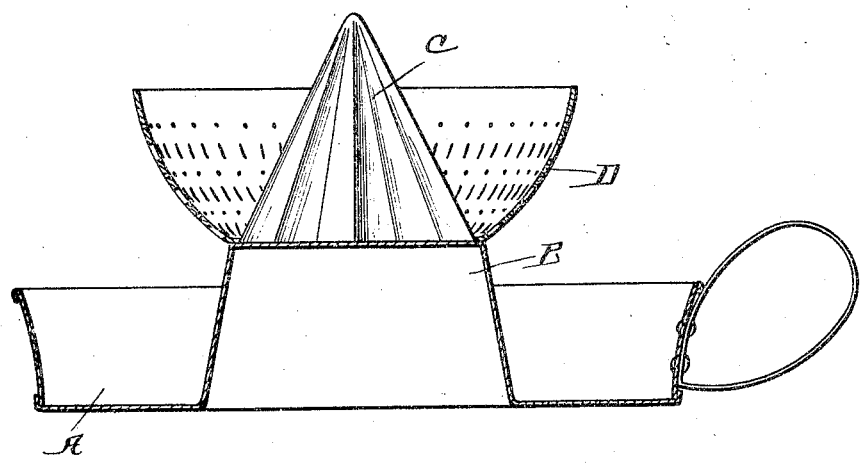
Witnesses
H. B. Hallock.
L. A. Morrison.
Inventor
Eliza D. Conroy
By W. Preston Williamson
Atty.

No. 789,080.　　　　　　　　　　　　　　　　　　　　Patented May 2, 1905.

UNITED STATES PATENT OFFICE.

ELIZA D. CONROY, OF CLEBURNE, TEXAS, ASSIGNOR OF ONE-HALF TO L. D. JOBE, OF CLEBURNE, TEXAS.

LEMON-JUICE EXTRACTOR.

SPECIFICATION forming part of Letters Patent No. 789,080, dated May 2, 1905.

Application filed October 13, 1904. Serial No. 228,323.

*To all whom it may concern:*

Be it known that I, ELIZA D. CONROY, a citizen of the United States, residing at Cleburne, county of Johnson, and State of Texas, have invented a certain new and useful Improvement in Lemon-Juice Extractors, of which the following is a specification.

My invention relates to a new and useful improvement in lemon-juice extractors, and has for its object to provide a simple, cheap, but effective and durable device of this description by which all of the juice will be extracted from the lemon and the juice may be received in a pan connected with the extractor minus the seeds and pulp, and the extractor is so constructed that the juice cannot spurt out upon the operator.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawing, forming a part of this specification, in which is represented a vertical section through my improved lemon-juice extractor.

A represents a pan the center of which is raised, as indicated at B, and upon the top of the raised portion is located the conical corrugated portion C, which is shaped the same as the ordinary lemon-juice extractors usually made of glass, the juice being extracted from the lemon by cutting the lemon in half and pressing the half of the lemon downward upon the point of the conical portion C and at the same time turning the lemon around the corrugations, and the cone C will remove the pulp and juice from the lemon, and the pulp and juice will fall down the sides of the cone.

The ordinary lemon-juice extractors have simply the cone and a groove surrounding the base of the same, in which the juice is caught; but as the pulp also goes into this groove it is poured out with the juice, and when the pulp is not wanted it must be strained before being used. In my improved lemon-juice extractor I surround the lower part of the cone C with the bowl-shaped sieve or strainer D, and this strainer flares outward from the base of the cone, so that sufficient room is left for pressing the lemon downward upon the cone, and into this strainer passes all the juice and pulp extracted from the lemon, the pulp being retained within the strainer and the juice passing through the strainer downward into the pan A, from which it may be poured when sufficient juice has accumulated within the pan. The strainer D may either be made integral with the extractor or may be made removable, the latter construction probably being preferable to facilitate the cleaning of the device.

The strainer D not only strains the pulp from the juice, but also forms a shoulder which will prevent the juice from spurting or flying outward upon the clothes of the operator while the lemon is being manipulated.

Of course I do not wish to be limited to the exact construction here shown, as slight modifications could be made without departing from the spirit of my invention.

Having thus fully described my invention, what I claim as new and useful is—

As a new article of manufacture, a lemon-juice extractor consisting of a pan, a raised portion located in the center of the pan, a corrugated cone resting upon the top of the raised portion, a bowl-shaped sieve surrounding the cone, the walls of the sieve flaring upward and outward from the base of the cone, as and for the purpose specified.

In testimony whereof I have hereunto affixed my signature in the presence of two subscribing witnesses.

ELIZA D. CONROY.

Witnesses:
　　G. R. WOODHEAD,
　　F. J. WASSELL.